US011150170B2

(12) United States Patent
Kwon et al.

(10) Patent No.: US 11,150,170 B2
(45) Date of Patent: Oct. 19, 2021

(54) APPARATUS AND METHOD FOR MEASURING DEFORMATION STIFFNESS OF A SECONDARY BATTERY

(71) Applicant: Samsung Electronics Co., Ltd., Suwon-si (KR)

(72) Inventors: Boksoon Kwon, Suwon-si (KR); Youngsuk Jung, Suwon-si (KR); Heechul Jung, Gunpo-si (KR); Eunha Lee, Seoul (KR); Seongho Jeon, Yongin-si (KR); Sungsoo Han, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 284 days.

(21) Appl. No.: 16/381,214

(22) Filed: Apr. 11, 2019

(65) Prior Publication Data

US 2020/0132577 A1 Apr. 30, 2020

(30) Foreign Application Priority Data

Oct. 26, 2018 (KR) .................. 10-2018-0129332

(51) Int. Cl.
| | | |
|---|---|---|
| *G01N 3/14* | (2006.01) | |
| *H01M 10/42* | (2006.01) | |
| *G01N 3/20* | (2006.01) | |
| *G01N 3/26* | (2006.01) | |
| *H02J 7/00* | (2006.01) | |

(52) U.S. Cl.
CPC .......... *G01N 3/14* (2013.01); *H01M 10/4285* (2013.01); *G01N 2203/0033* (2013.01); *G01N 2203/0075* (2013.01); *G01N 2203/026* (2013.01); *H02J 7/0068* (2013.01)

(58) Field of Classification Search
CPC .......... G01M 5/0041; H01M 10/4285; H01M 10/48; H01M 2200/20; G01B 5/30; G01B 5/18; G01B 5/14; G01B 5/02; G01B 5/004; G01B 7/06; G01B 11/06; G01B 21/08; Y02E 60/10; G01R 31/36; G01R 31/3634; G01R 31/3655; G01L 5/00; G01L 1/26; G01L 1/16

See application file for complete search history.

(56) References Cited

U.S. PATENT DOCUMENTS

| 10,184,778 B2 | 1/2019 | Yoon et al. |
| 2017/0074634 A1* | 3/2017 | Yoon ................. G01B 11/06 |
| 2018/0123189 A1* | 5/2018 | Biswas ............. H01M 10/4257 |

FOREIGN PATENT DOCUMENTS

| JP | 2010032492 A | 2/2010 |
| KR | 1020140137562 A | 12/2014 |
| KR | 1020160063278 A | 6/2016 |
| KR | 1020160078312 A | 7/2016 |

* cited by examiner

*Primary Examiner* — Brandi N Hopkins
(74) *Attorney, Agent, or Firm* — Cantor Colburn LLP

(57) ABSTRACT

An apparatus for measuring a deformation stiffness of an article includes a force measuring means configured to measure a force generated in a thickness direction of the article; a thickness measuring means configured to measure a thickness of the article; and a data processor configured to differentiate force with respect to thickness to calculate the deformation stiffness of the article, wherein each of the force and the thickness are a result of a volume change of the article.

20 Claims, 23 Drawing Sheets

APPARATUS AND METHOD FOR MEASURING DEFORMATION STIFFNESS OF A SECONDARY BATTERY

CROSS-REFERENCE TO RELATED APPLICATION

This application claims priority to and the benefit of Korean Patent Application No. 10-2018-0129332, filed on Oct. 26, 2018, in the Korean Intellectual Property Office, and all the benefits accruing therefrom under 35 U.S.C. § 119, the content of which is incorporated herein by reference in its entirety.

BACKGROUND

1. Field

The present disclosure relates to an apparatus and a method for measuring a mechanical property related to deformation of an object.

2. Description of the Related Art

Various types of secondary batteries, such as a pouch type, a prismatic type, a cylindrical type, a coin type, etc., have been developed. These batteries may be used individually or may be stacked to form a large capacity battery. A battery pack including a plurality of secondary batteries may have various sizes and shapes. The plurality of secondary batteries may be fitted into an outer pack, or positions of the inner batteries may be fixed within a defined space in the interior of the outer pack.

A secondary battery may have a stacked structure including a cathode, a separator, an anode, and a current collector. A contact between components may affect the performance of the secondary battery. When the secondary battery is charged and discharged, during the electrochemical reactions and migration of metal ions which occur therein, a volume change may occur due to expansion/contraction of an electrode material and/or due to the generation of gas by an electrolyte. As a result, it would be beneficial to provide an apparatus and method capable of measuring a change in a mechanical property of the secondary battery caused by a volume change which occurs during the operation of the secondary battery.

SUMMARY

Provided is an apparatus and a method for measuring a change in a mechanical property of an article in response to a deformation (a volume change) of an object.

Provided is an apparatus and a method for evaluating the mechanical property of an object, such as a secondary battery, nondestructively.

Additional aspects will be set forth in part in the description which follows and, in part, will be apparent from the description, or may be learned by practice of the presented embodiments.

According to an aspect of an embodiment, an apparatus for measuring a deformation stiffness of an article includes: a force measuring means configured to measure a force generated in a thickness direction of the article; a thickness measuring means configured to measure a thickness of the article; and a data processor configured differentiate force with respect to thickness to calculate the deformation stiffness of the article, wherein each of the force and the thickness are a result of a volume change of the article.

The deformation stiffness may include an expansion stiffness caused by a volume expansion of the article.

The apparatus may further includes a pedestal configured to receive the object.

The force measuring means may include: a moving member configured to be disposed on the article and to move according to the volume change of the object; a fixing member disposed on the moving member; and a force detection sensor disposed between the moving member and the fixing member.

The thickness measuring means may include a support; a thickness sensor; and a weight-applying member configured to be disposed between the article and the thickness sensor.

The moving member, the force measuring means is configured to be disposed on a first region of the object, and the thickness measuring means may be configured to be disposed on a second region of the object, wherein the second region is spaced apart from the first region.

An area of the article including the first region and an area of article including the second region may be the same or substantially the same, and a force applied to the first region during an initial measurement and a force applied to the second region during the initial measurement may be the same or substantially the same.

A hole may be defined in each of the moving member and the fixing member, wherein the force detection sensor may have a donut shape having an opening at a center thereof, and the thickness sensor may be configured to measure the change in thickness of the article through the hole and the opening.

The thickness sensor may be configured to come into direct contact with a surface of the article to measure the change in thickness.

The apparatus may further include a weight-applying member disposed between the object and the thickness sensor.

The force measuring means may include a plurality of the force detection sensors, which may be disposed in an edge region of the moving member, the force measuring means may include a plurality of the fixing members disposed corresponding to the plurality of force detection sensors, a hole may be defined in a center portion of the moving member or in a region adjacent thereto, and the thickness sensor may be configured to measure the change in thickness of the article through the hole.

The article may include a secondary battery, and the apparatus may further include a charging/discharging apparatus configured to charge/discharge the secondary battery.

The article, the force measuring means, and the thickness measuring means may each be disposed in a temperature-controlled chamber.

According to an aspect of another embodiment, a method of measuring a deformation stiffness of an article includes measuring a force generated in a thickness direction of the article; measuring thickness of the article; and differentiating the force with respect to the thickness to calculate the deformation stiffness, wherein each of the force and the thickness are a result of a volume change of the article.

The measuring of the change in force and the measuring of the change in thickness may occur substantially at the same time.

The deformation stiffness may include an expansion stiffness caused by a volume expansion of the article.

The deformation stiffness may be expressed by Equation 3

$$\lim_{\Delta h \to 0} \frac{\Delta F}{\Delta h} = \left(\frac{F}{h}\right)' = \frac{dF}{dh} \qquad \text{Equation 3}$$

wherein F denotes a force generated in the thickness direction of the article and h denotes a thickness of the object.

The article may include a secondary battery, and the method may further include charging or discharging the secondary battery.

The method may further include adjusting a temperature of the object.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
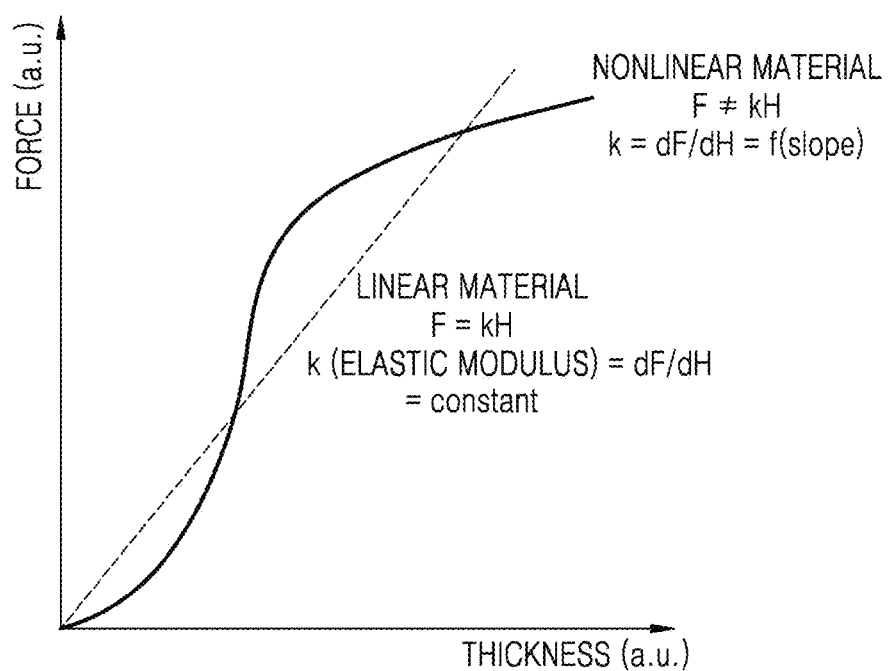
FIG. 1 is a graph of force (arbitrary units, a.u.) versus thickness (arbitrary units, a.u.) illustrating the relationship between force and thickness for both a linear material and a nonlinear material.

Various example embodiments will now be described more fully with reference to the accompanying drawings in which example embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein the term "and/or" may include any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, when the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. "At least one" is not to be construed as limiting "a" or "an." "Or" means "and/or." It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, an apparatus and method for measuring a mechanical property related to deformation of an article will be described in detail with reference to the accompanying drawings. The width and thickness of layers or regions illustrated in the accompanying drawings may be somewhat exaggerated for clarity and ease of description. Like reference numerals designate like elements throughout the specification.

FIG. 1 is a graph showing a change in force F with respect to a change in thickness H. As shown in FIG. 1, the relationship between force F and thickness H for a given article may be used to characterize a material as a linear material or nonlinear material. Here, the term force means a force applied to an object, and in particular, refers to a force in a thickness direction of an article, e.g., to the change a thickness of a material or an object.

Referring to FIG. 1, an article having a linear stiffness, e.g., an article fabricated of a linear material may have a linear relationship between the change in thickness H and the change in force F, as shown, for example, by Equation 1, in which F is a force, k is an elastic modulus, and H is a thickness. An elastic modulus k of the linear material is a ratio of the force exerted upon a substance or body to the resulting deformation, e.g., thickness change, and may be a constant value, as shown in Equation 2.

$$F = kH \qquad \text{Equation 1}$$

$$k = \Delta F / \Delta H \qquad \text{Equation 2}$$

An article having nonlinear stiffness, e.g., an article formed of a nonlinear material, is an article having a nonlinear relationship between thickness and force (e.g., $F \neq kH$, wherein F is force, H is thickness, and k is an elastic modulus). Accordingly, the elastic modulus k of the nonlinear material may not be constant, and may be expressed as a function of the slope of a line drawn through the curve representing a change of force F versus a change in thickness H of the article (e.g., k=f(slope)).

A battery, e.g. a cell of a battery, for example a secondary battery, may have a property of a nonlinear material. In a battery or cell which is an elastic body, an electrode material, a state of charge of an electrode, a solid-electrolyte interphase (SEI), and an electrolyte may each change in accordance with a change in electric potential during charge and discharge of the battery. Due to these changes, the internal stiffness of the battery or cell, or the elastic modulus K, or the external stiffness expressed on an external surface of the battery or cell may be different. According to movement of metal ions (e.g., lithium ions) during charge and discharge, the battery or cell may exhibit stiffness properties corresponding to a nonlinear material.

Figure 2:
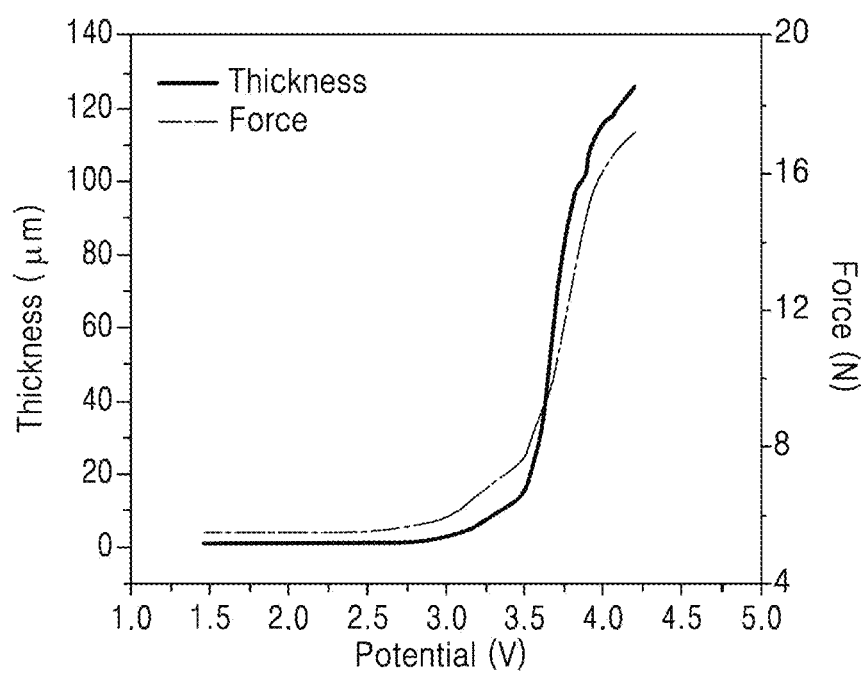
FIG. 2 is a graph of thickness (micrometers, μm) and force (Newtons, N) versus potential (volts, V), illustrating a change in thickness and a change in force according to an electric potential applied to the battery when the battery is charged.

FIG. 2 is a graph illustrating thickness and force according to an electric potential (V) applied to a cell when the cell is charged. Here, the cell was a lithium secondary battery. Referring to FIG. 2, as the potential (V) increases, the thickness of the cell increases and, similarly, force also tends to increase. As shown in FIG. 2, above about 3.5 volts, the thickness and force change significantly. The change in thickness and the change in force do not directly coincide, but rather differ from one another.

Figure 3:
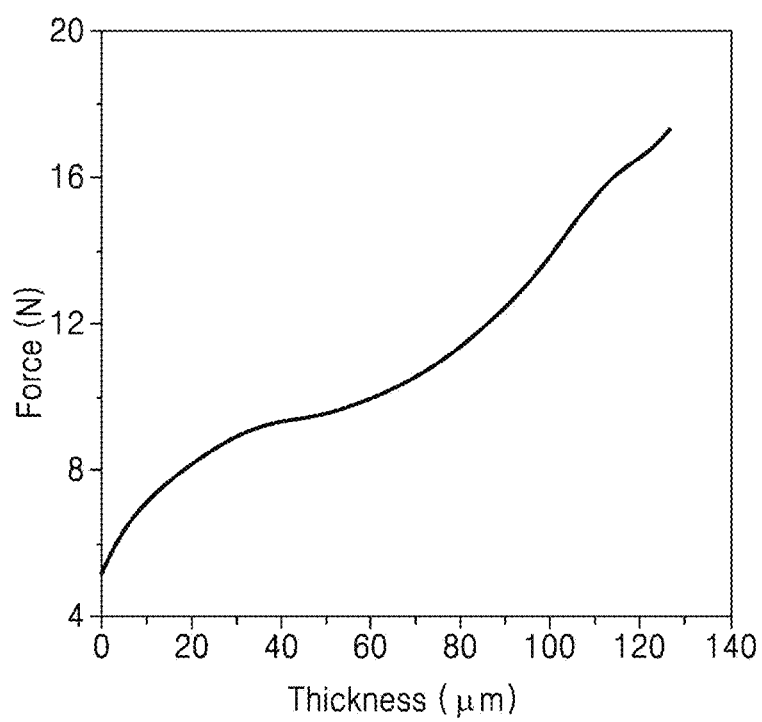
FIG. 3 is a graph of force (Newtons, N) versus thickness (μm), obtained from a result of FIG. 2, showing a change in force with respect to a change in thickness of the battery.

FIG. 3 is a graph obtained from the results of FIG. 2, and is a graph of force with respect to a thickness. Referring to FIG. 3, it may be seen that thickness and force have a nonlinear relationship.

Figure 4:
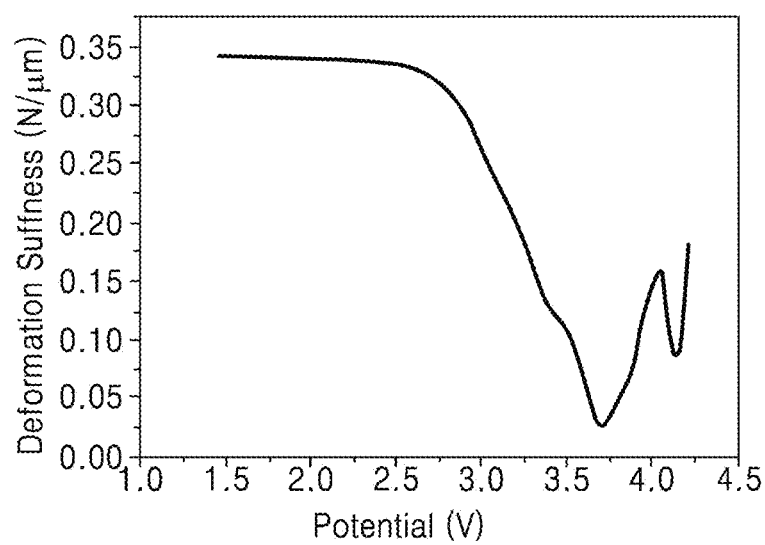
FIG. 4 is a graph of stiffness (Newtons per micrometer, N/μm) versus potential (V), obtained from the results of FIGS. 2 and 3, showing a result of calculating a deformation stiffness by differentiating a change in force with respect to a change in thickness.

FIG. 4 is a graph obtained from results of FIGS. 2 and 3, and showing a deformation stiffness of the cell according to the applied potential. Stiffness is the derivative of force with respect to displacement, and thus deformation stiffness DS can be obtained by differentiating force with respect to thickness. The deformation stiffness DS may be expressed as a function of potential.

Referring to FIG. 4, it may be seen that as the potential increases, the deformation stiffness DS changes. As the volume of a battery or cell (an object) increases during charge of the battery or cell (the object), a stiffness value of the battery or cell (an instantaneous rate of change), obtained by differentiating the force with respect to the thickness, i.e., the deformation stiffness DS, may change. Here, since the deformation stiffness DS is a value related to a volume increase (expansion) of the battery or cell (the object), deformation stiffness DS may be referred to as an expansion stiffness ES. The expansion stiffness ES may reflect the ability of the article to resist the volume change when the article expands. The expansion stiffness ES may also be referred to as an "expansion strength."

The deformation stiffness DS may be expressed by Equation 3.

$$\lim_{\Delta h \to 0} \frac{\Delta F}{\Delta h} = \left(\frac{F}{h}\right)' = \frac{dF}{dh} \qquad \text{Equation 3}$$

In Equation 3, F denotes a force generated in a thickness direction by the volume change of the object (e.g., a volume change of the battery or cell), and h denotes thickness of the article or object (e.g., of the battery or cell).

In FIG. 4, the case where the deformation stiffness DS is expressed as a function of the potential is shown. Deformation stiffness DS may be also be expressed as a function of time or temperature.

Figure 5:
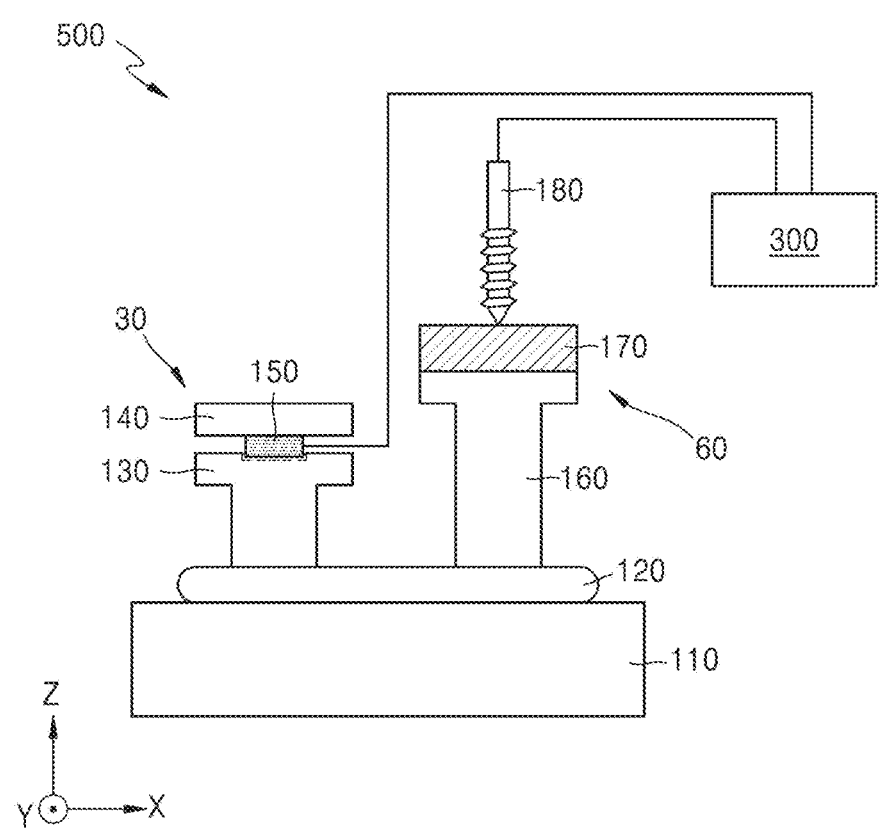
FIG. 5 is a schematic diagram of an apparatus for measuring a deformation stiffness of an article according to an embodiment.

FIG. 5 is a schematic diagram showing an apparatus 500 for measuring the deformation stiffness DS of an article 120 according to an embodiment.

Referring to FIG. 5, the apparatus 500 includes a pedestal 110 configured to receive an article 120, for example, the article 120 may be placed on the pedestal 110. The article 120 may be, for example, a cell (e.g., a pouch type cell, or a pouch type battery). A moving member 130 may be disposed on the article 120, a position of which may be movable in a vertical direction according to a volume change of the article 120. The moving member 130 may be, for example, a T-shaped moving plate or may have a different shape. On the moving member 130, a fixing member 140 having a fixed position may be disposed. Here, a member, e.g., a setscrew, for fixing the position of the fixing member 140 in place, is not shown for the sake of convenience. The fixing member 140 may have a plate shape. A force detection sensor 150 may be disposed between the moving member 130 and the fixing member 140. A groove may be provided in an upper surface of the moving member 130. The force detection sensor 150 may be disposed in the groove. The groove may facilitate the placement of the force detection sensor 150 on the center of the upper surface of the moving member 130 and may simultaneously prevent horizontal movement of the force detection sensor 150 on the upper surface. The force detection sensor 150 may measure a change in force acting in a thickness direction according to the volume change of the article 120. The force detection sensor 150 may be a load cell, or other suitable sensor capable of generating an electrical signal which is proportional to the force.

A thickness sensor 180 configured to measure a change in a thickness of the article 120 may be provided. A support 160 may be disposed on the article 120. A weight 170 may be disposed on the support 160. The thickness sensor 180 may be in contact with an upper surface of the weight 170. The support 160 may be, for example, a T-shaped structure, and may be formed of a material that is heat resistant (e.g., resistant to deformation by heat) and has a relatively light weight. The support 160 may be in direct contact with the article 120. The weight 170 may be formed of a relatively heavy material, and may have a plate type structure. An initial force applied to the article 120 may be changed by varying the mass of the weight 170. The initial force applied to the article 120 may be determined based upon the sum of the weight of the support 160 and the weight of the weight 170. In this regard, the support 160 and the weight 170 may together constitute a "weight-applying member." The thickness sensor 180 may be, for example, a linear variable differential transducer (LVDT) sensor, which is an electrical transducer for measuring a linear distance and converting the measurement to an electrical signal. However, a type of the thickness sensor 180 is not limited thereto, and a different suitable sensor may be used. Although not shown, a member for fixing the position of the thickness sensor 180 may be further provided.

The moving member 130, the force detection sensor 150, and the fixing member 140 may be disposed on a first region of the article 120. The support 160, the weight 170, and the thickness sensor 180 may be disposed on a second region of the article 120 that is spaced apart from the first region. Here, an area of the first region and an area of the second region may be the same or substantially the same. In this case, a force applied to the first region at an initial measurement (initial force) and a force applied to the second region at the initial measurement may be the same or substantially the same. When the initial force applied to the first region and the initial force applied to the second region are substantially the same, a change in force due to a volume change may be measured in the first region, and a change in thickness due to the volume change may be measured in the second region. That is, the change in force and the change in thickness may be measured under the same conditions. However, in some cases, the area of the first region and the area of the second region may be different from each other, and the magnitude of the initial force applied to the first region and the magnitude of the initial force applied to the second region may be different from each other. In this case, a value of the deformation stiffness DS may be calculated reflecting this difference.

The apparatus according to an embodiment may further include a data processor 300 for measuring (e.g., calculating) a value obtained by differentiating force with respect to thickness of the article 120. The value obtained by differentiating force with respect to thickness corresponds to the deformation stiffness DS as described above. The data processor 300 may be electrically and/or physically connected to the force detection sensor 150 and the thickness sensor 180.

The apparatus according to an embodiment may include a "force measuring means" configured to measure the force or change in force generated in the thickness direction due to the change in volume of the article 120, a "thickness measuring means" configured to measure the thickness or the change in thickness due to the change in volume of the article 120, and the data processor 300. Here, the force measuring means 30 may include the moving member 130, the fixing member 140, the force detection sensor 150, and the fixing member 140, and the thickness measuring means 60 may include the weight-applying member including the support 160 and the weight 170, and the thickness sensor 180. The apparatus according to an embodiment may be a force and thickness measurement system (FTMS) for simultaneously measuring a force or a change in force, and thickness or a change in thickness caused by a volume change of an article.

Figure 6A:
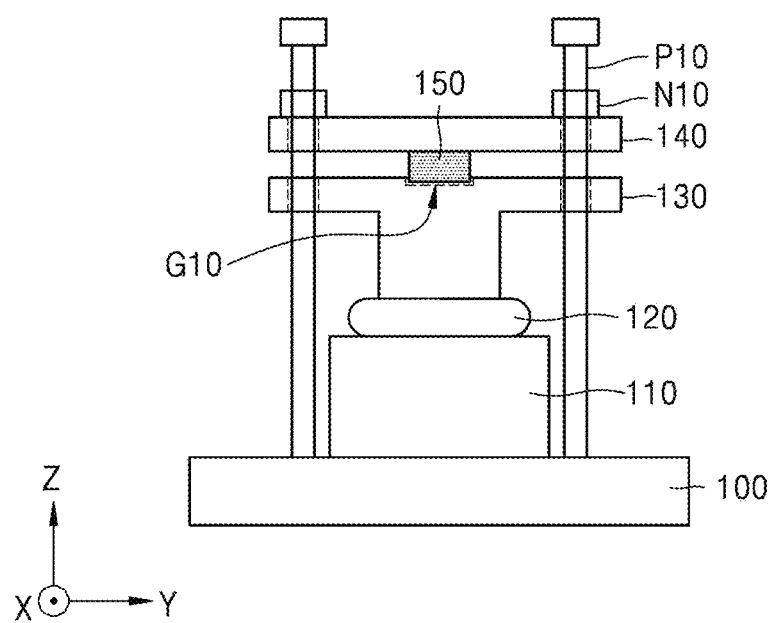
FIG. 6A is an illustration of a force measuring means that may be used in an apparatus for measuring deformation stiffness according to an embodiment.

FIG. 6A is a diagram showing more specifically, a force measuring means that may be used in an apparatus for measuring the deformation stiffness DS of an article, according to an embodiment. That is, FIG. 6A shows more specifically a force measuring means including the moving member 130, the force detection sensor 150, and the fixing member 140 in FIG. 5.

Referring to FIG. 6A, the pedestal 110 may be disposed on a base portion 100, the article 120 may be placed on the pedestal 110, and the moving member 130, the force detection sensor 150, and the fixing member 140 may be placed on the article. A groove G10 may be defined in an upper surface portion of the moving member 130. The force detection sensor 150 may be disposed to be partially inserted into the groove G10.

A plurality of support columns P10 may be provided on the base portion 100. The support columns P10 may be inserted through holes defined in the moving member 130 and the fixing member 140. The support columns P10 may include helical threads and may be configured to fix a position of the fixing member 140 by the application of pressure on an upper surface of the fixing member 140 using, for example, a nut N10. An initial force applied to the article 120 may be adjusted using a tightening force by turning the nut N10.

Figure 6B:
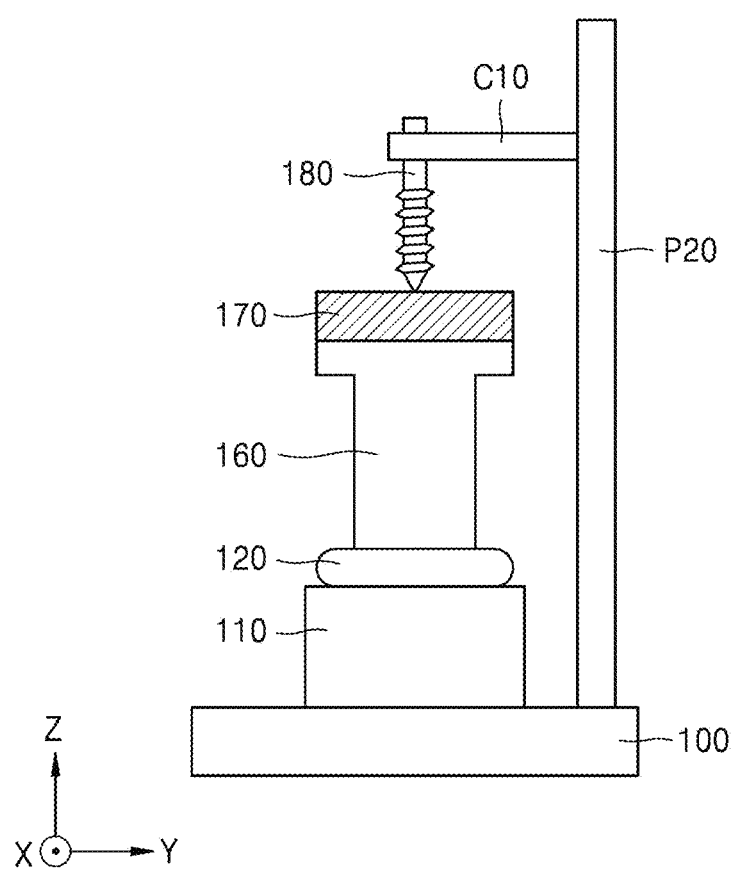
FIG. 6B is an illustration of a thickness measuring means that may be used in an apparatus for measuring deformation stiffness according to an embodiment.

FIG. 6B is a diagram showing more specifically, a thickness measuring means that may be used in an apparatus for measuring the deformation stiffness DS of an article, according to an embodiment. That is, FIG. 6B shows more specifically a thickness measuring means including the support 160, the weight 170, and the thickness sensor 180 shown in FIG. 5.

Referring to FIG. 6B, the pedestal 110 may be provided on the base portion 100, the article 120 may be placed on the base portion 100, and the support 160, the weight 170, and the thickness sensor 180 may be placed on the article 120. A support column P20 may be disposed on the base portion 100. A clamp C10 may be physically connected to and/or disposed on the support column P20 and may be used to hold the thickness sensor 180.

Figure 7:
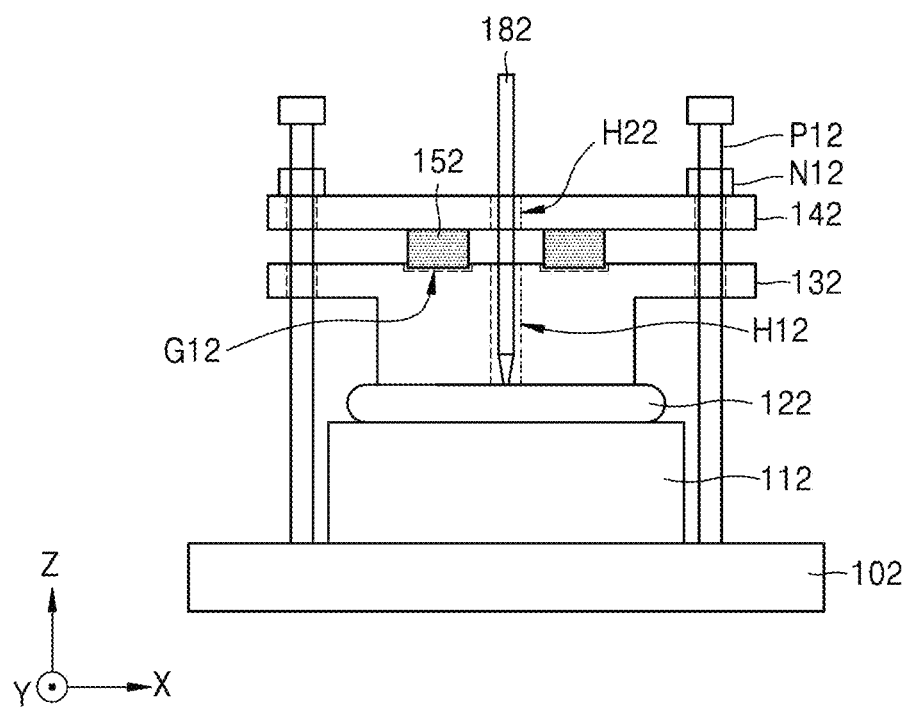
FIG. 7 is a schematic diagram of an apparatus for measuring deformation stiffness according to another embodiment.

FIG. 7 is a schematic diagram showing an apparatus for measuring the deformation stiffness DS of an article according to another embodiment.

Referring to FIG. 7, a pedestal 112 may be placed on the base portion 102, an article 122 may be placed on the pedestal 112, and a moving member 132, a force detection sensor 152, and a fixing member 142 may be placed on the article 112. A groove G12 may be formed in an upper surface portion of the moving member 132. The force detection sensor 152 may be disposed to be partially inserted into the groove G12. The force detection sensor 152 may have a donut shape having an opening at the center thereof. The groove G12 may have a circular shape to facilitate insertion of the force detection sensor 152. A hole H12 for exposing the article 122 may be defined in the moving member 132. A hole H22 may also be defined in the fixing member 142.

A plurality of support pillars P12 may be provided on the base portion 102. The support columns P12 may be inserted through holes defined in the moving member 132 and the fixing member 142. The supporting columns P12 may include a helical thread and may be configured to fix a position of the fixing member 142 by pressing an upper surface of the fixing member 142 using, for example, a nut N12. An initial force applied to the article 122 may be adjusted by using a tightening force by turning the nut N12.

A thickness sensor 182 for measuring a thickness or a change in thickness of the article 122 may be configured to be inserted through the hole H12 of the moving member 132, the hole H22 of the fixing member 142, and the opening of the force detection sensor 152. A tip portion of the thickness sensor 182 may be in direct contact with the article 122 to measure the change in thickness. Although not shown, the thickness sensor 182 may be connected and/or disposed on a pillar P12 using a clamp.

When a size of the hole H12 defined in the moving member 132 is small, a size of a region of the article 122 where the thickness is measured (thickness measure region) is also small, and when force is applied to a region (force measure region) of the article 122 in an area around the thickness measure region by the moving member 132, the thickness measure region may receive a pre-load similar to the force measure region. Thus, the change in thickness may be measured by placing the thickness sensor 182 in direct contact with the article 122.

However, in some cases, after providing a predetermined weight-applying member between the article 122 and the thickness sensor 182, the change in the thickness of the article 122 may be measured by placing the thickness sensor 182 in contact with the weight applying member. In this case, after inserting a pole structure into the holes H12 and H22, a plate type weight may be provided on the pole structure, and the thickness sensor 182 may be provided on the plate type weight.

Figure 8:
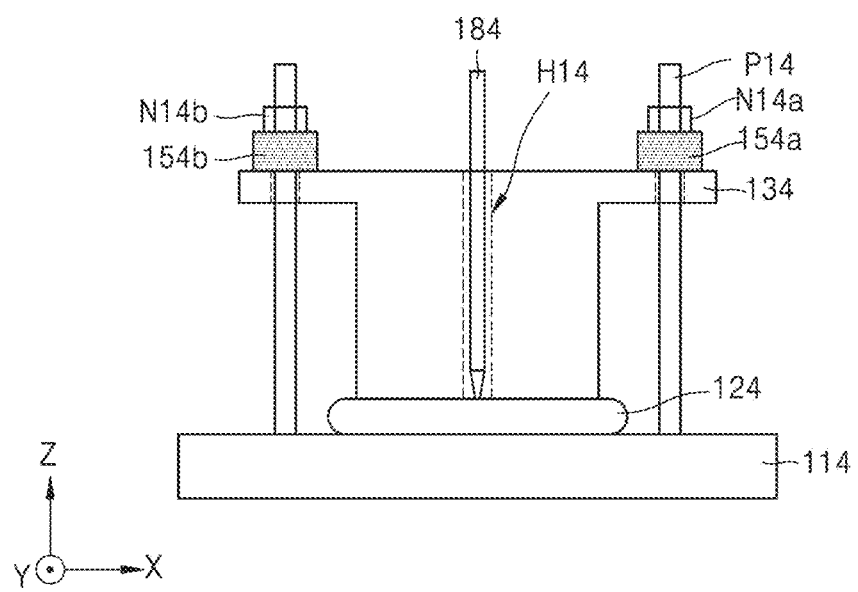
FIG. 8 is a schematic diagram of an apparatus for measuring deformation stiffness according to another embodiment.

FIG. 8 is a schematic diagram showing an apparatus for measuring the deformation stiffness DS of an article according to another embodiment.

Referring to FIG. 8, an article 124 may be placed on a pedestal 114, and a moving member 134 may be provided on the article 124. A plurality of support columns P14 may be provided on the pedestal 114. The support columns P14 may be inserted in holes defined in the moving member 134. A plurality of force detection sensors 154a, 154b may be disposed at an edge region of the moving member 134. A plurality of fixing members N14a, N14b corresponding to the plurality of force detection sensors 154a, 154b may be disposed to secure the force detection sensors 154a, 154b in place. The plurality of support columns P14 may be inserted the plurality of force detection sensors 154a, 154b and the plurality of fixing members N14a, N14b. The plurality of fixing members N14a, N14b may have a nut structure and may adjust an initial force applied to the article 124 by using a tightening force to turn the fixing member N14. The number of force detection sensors 154a, 154b may be two or four, but the number may vary.

A hole H14 may be defined in the center portion of the moving member 134 or in a region adjacent thereto. A thickness sensor 184 configured to measure a change in thickness of the article 124 through the hole H14 may be disposed therein. A tip portion of the thickness sensor 184 may be in direct contact with the article 124 to measure the change in thickness. Although not shown, the thickness sensor 184 may be held using a clamp which is connected to and/or disposed on a pillar P14. Also, in some cases, after providing a weight applying member between the article 124 and the thickness sensor 184, the thickness sensor 184 may be in contact with the weight applying member to measure the change in thickness of the article 124.

Although not shown, in the embodiments of FIGS. 7 and 8, the apparatus may further include a data processor 300 as described in FIG. 5.

Figure 9:
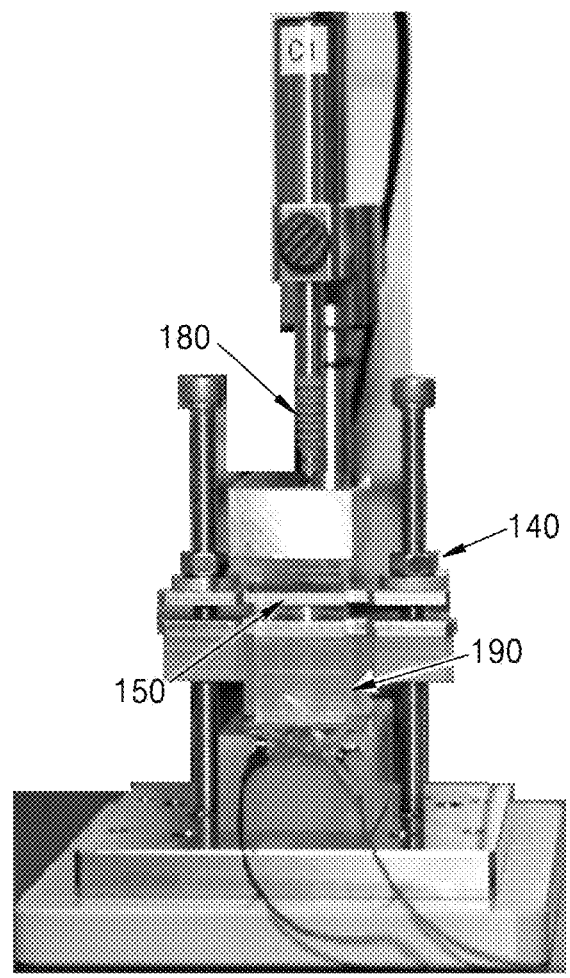
FIG. 9 is a photograph of an apparatus for measuring a deformation stiffness of an object, according to an embodiment.

FIG. 9 is a photographic image of an apparatus for measuring the stiffness of an article, according to an embodiment.

Referring to FIG. 9, the apparatus for measuring the deformation stiffness DS of the present embodiment may be similar to an apparatus described with reference to FIGS. 5, 6A and 6B. Here, the apparatus includes, a load cell as a force detection sensor 150, a linear variable differential transducer (LVDT) as a thickness sensor 180, and a fixing member 140 for force control, and a weight applying member 190 for weight control. "Force control" means setting an initial force, e.g., using a nut. "Weight control" means weight control, e.g., using a weight-applying member.

Figure 10:
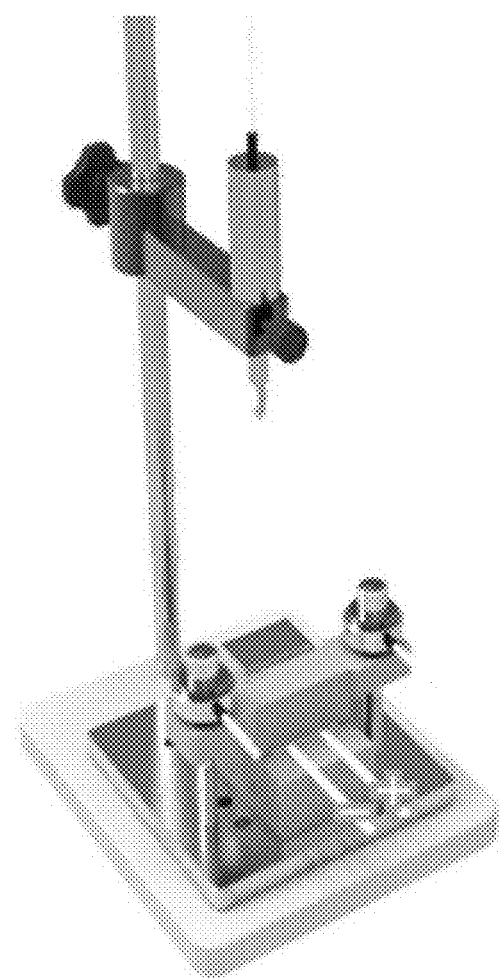
FIG. 10 is photograph showing an apparatus for measuring deformation stiffness of an object, according to another embodiment.
Figure 11:
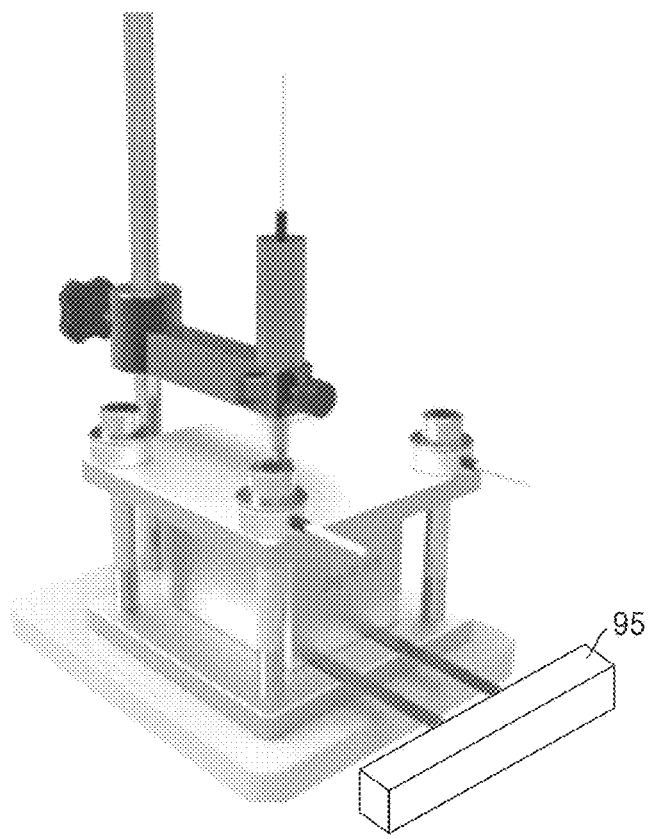
FIG. 11 is photograph showing an apparatus for measuring a deformation stiffness of an object, according to another embodiment.

FIGS. 10 and 11 are photographs of apparatuses for measuring the deformation stiffness DS of an article, according to additional embodiments. The apparatus of FIG. 10 may be similar to an apparatus described with reference to FIGS. 5, 6A and 6B. The apparatus of FIG. 11 may be similar to an apparatus described with reference to FIG. 8.

When an article includes a secondary battery, the apparatus may further include a charging/discharging apparatus 95 for charging/discharging of the secondary battery. Also, the article, force measuring means, and thickness measuring means may be disposed in a temperature-controlled chamber, for example, a chamber capable of controlling a temperature. The above-described charging/discharging apparatus 95 and the temperature-controlled chamber may be any suitable charge/discharge apparatus and/or temperature-controlled chamber, and thus a detailed description thereof will be omitted.

Figure 12:
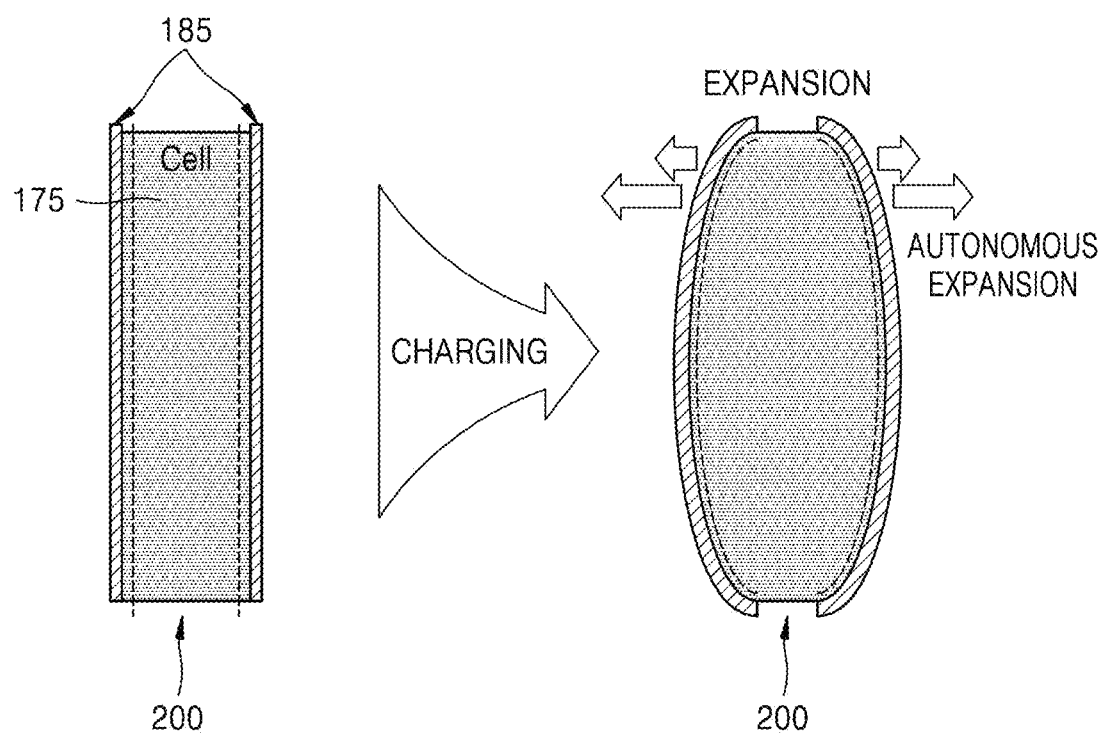
FIG. 12 is a schematic diagram showing a volume expansion of a secondary battery during charge.

FIG. 12 is a schematic diagram showing a process of volume expansion of a secondary battery 200 during charge of the secondary battery.

Referring to FIG. 12, the secondary battery 200 may include a cell 175 and a housing 185, each of which may expand in volume when the battery is charged. In the present embodiment, thickness of the secondary battery 200 may be measured in a state where autonomous changes in thickness, which occur when the secondary battery 200 is charged, are wholly (or partially) permitted. Also, force generated by the expansion of the cell may be measured in real time for each change in thickness. This method differs from the method of measuring pressure generated in the housing during charge in a state where the housing of the secondary battery 200 is completely (or substantially) restrained (suppressed). In an embodiment, the housing may be made of a material having a relatively low Young's modulus in order to permit autonomous changes in thickness when the secondary battery 200 is charged, and thus the secondary battery 200 may not be mechanically/structurally constrained in a thickness direction.

Figure 13:
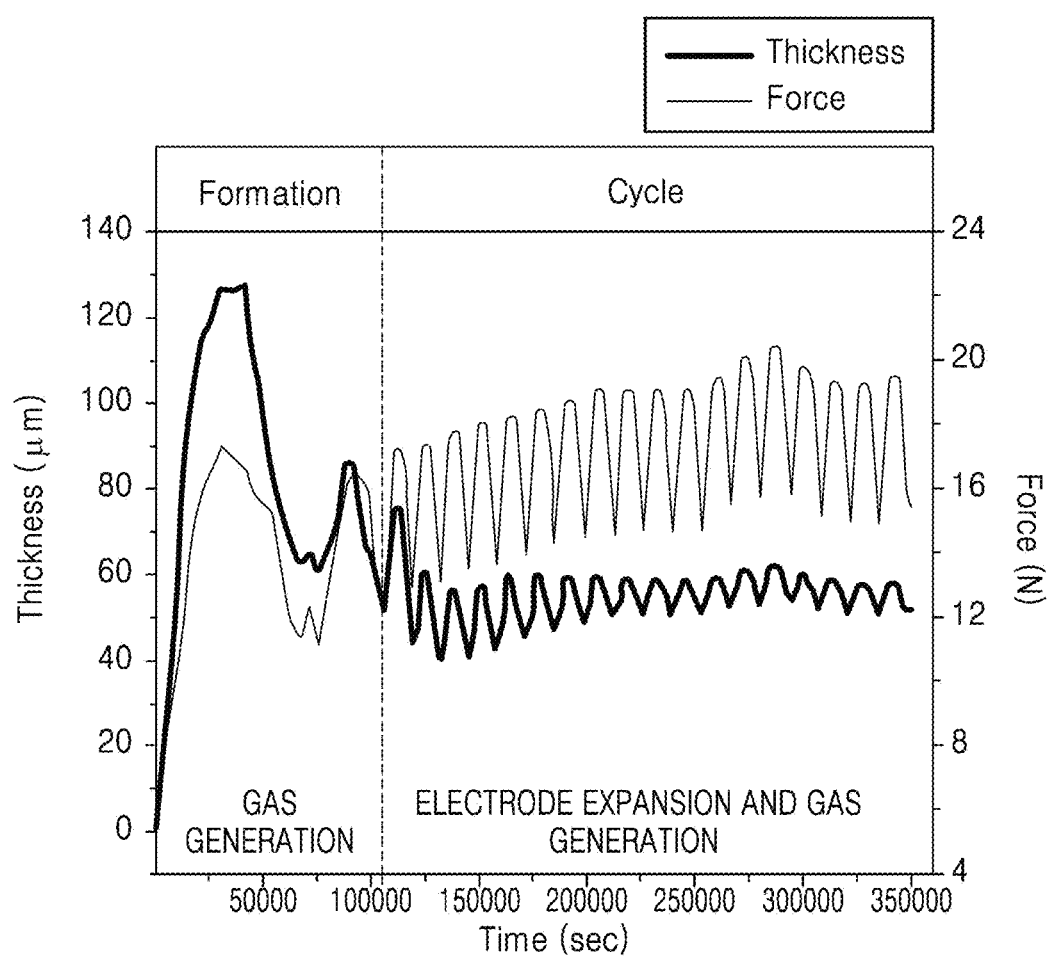
FIG. 13 is a graph of thickness (μm) and force (N) versus time (seconds, sec) showing changes in thickness and force over time during formation and during a charge/discharge cycling of a secondary battery.

FIG. 13 is a graph showing a change in thickness and a change in force over time during formation of a secondary battery and during a charge/discharge cycle of the secondary battery. A cathode of the secondary battery may include Li and Ni, an anode may include Si and C, a separator may include PE (polyester), and an electrolyte may include $LiPF_6$. At this time, a cell current density of the secondary battery was 3.4 amperes per square meter ($A/m^2$), a reference current of 1 C (C-rate) was 48 milliamperes (mA), and dimensions of an electrode was 30 millimeters×26 millimeters (780 $mm^2$).

Referring to FIG. 13, the changes in thickness and force during the formation and charge/discharge cycle steps exhibit different properties. In the formation step, and without being limited by theory, it is understood that the changes in thickness and force are primarily due to a gas generation, whereas in the charge/discharge cycle step, it is understood that the changes in thickness and force primarily occur due to electrode expansion. In the formation step, the gas generation may be dominant and the electrode expansion may partially occur. In the cycle step, the electrode expansion may be dominant and the gas generation may also partially occur.

Figure 14:
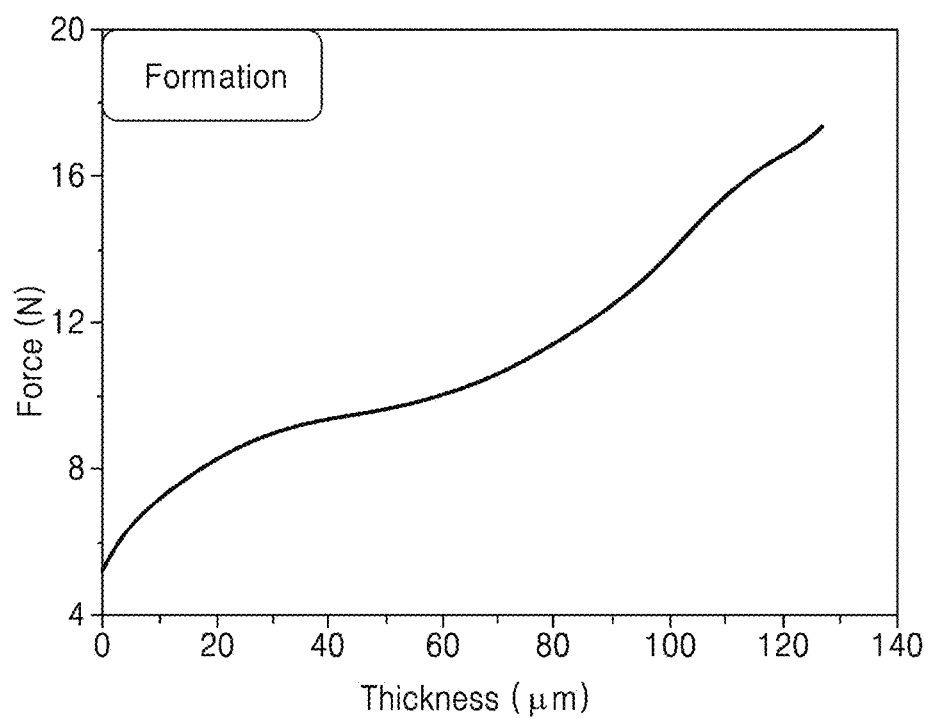
FIG. 14 is a graph of force (N) versus thickness (μm) showing a change in force with respect to a change in thickness during formation of a secondary battery.

FIG. 14 is a graph showing a change in force with respect to a change in thickness during a formation step of a secondary battery.

Figure 15:
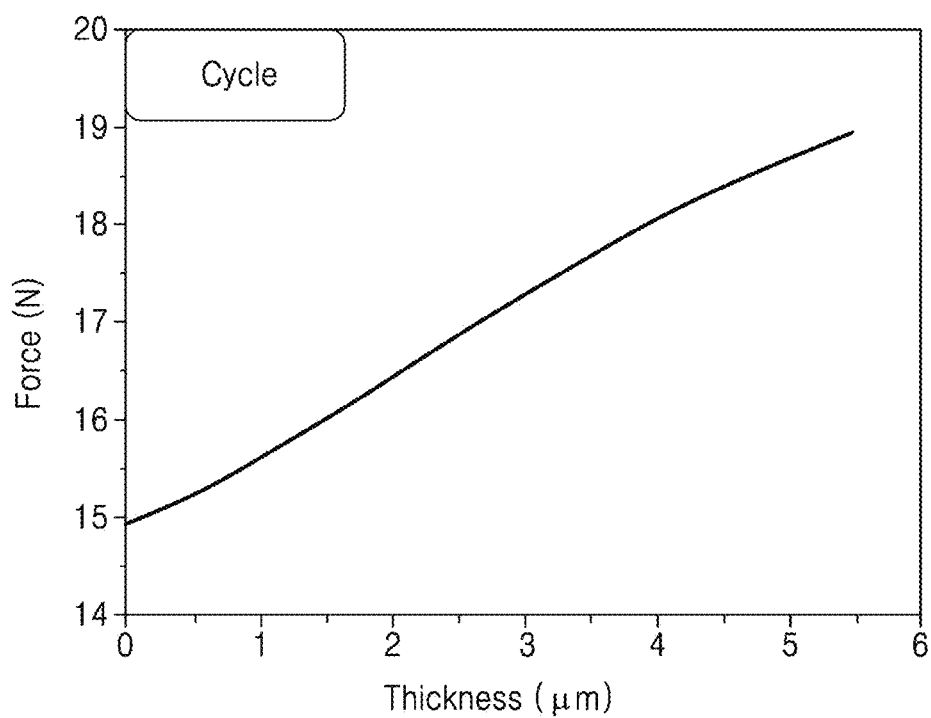
FIG. 15 is a graph of force (N) versus thickness (μm) showing a change in force with respect to a change in thickness during a charge/discharge cycle of a secondary battery.

FIG. 15 is a graph showing a change in force with respect to a change in thickness in a charge/discharge cycle step of a secondary battery.

Figure 16:
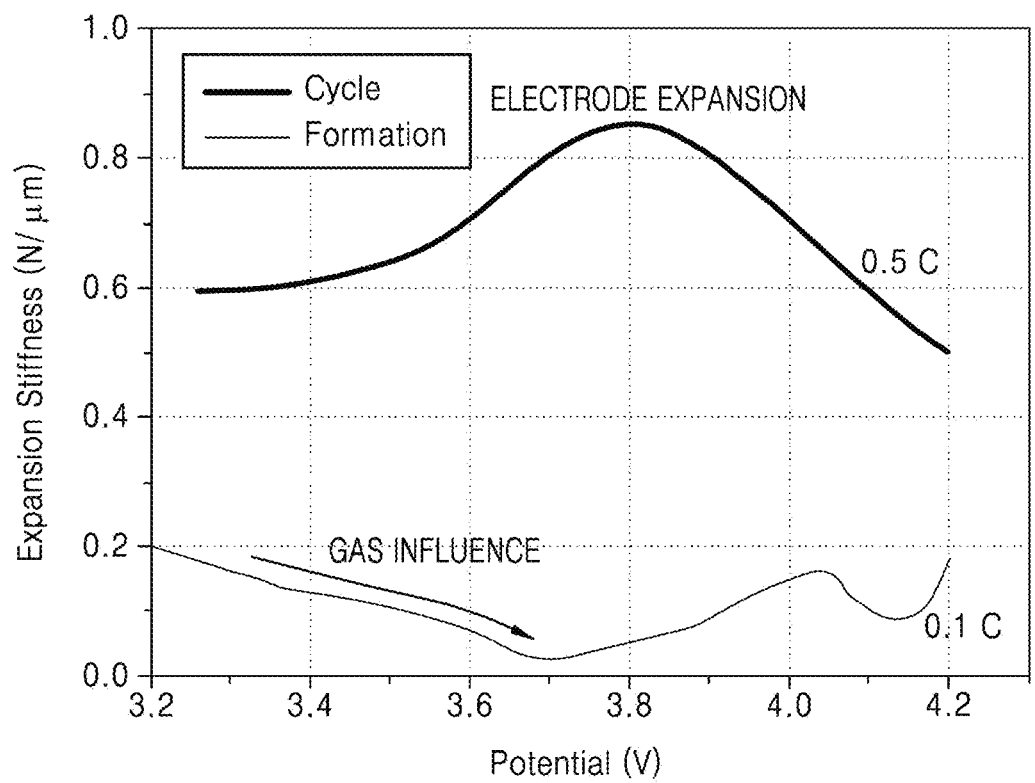
FIG. 16 is a graph of expansion stiffness (N/μm) versus potential (V), showing a result of calculating an expansion stiffness by differentiating a change in force with respect to a change in thickness during formation and cycling of the secondary battery.

FIG. 16 is a graph showing comparing the expansion stiffness ES determined by differentiating a change in force with respect to a change in thickness during the formation and charge/discharge cycle steps of a secondary battery. The expansion stiffness ES may be expressed as a function of the potential.

Referring to FIG. 16, a property of the expansion stiffness ES is different in the formation and cycle steps. Here, a formation period is the period of forming the secondary battery at a C-rate of 0.1 C, and a charge/discharge cycle period is a period for charging the secondary battery at a C-rate of 0.5 C. As a result of comparison of a value of the expansion stiffness ES, when gas is primarily generated, the value of the expansion stiffness ES was reduced and observed to be about 0.2 Newtons per micrometer (N/μm) or less in the formation period. On the other hand, in the cycle period after an amount of gas is generated in the formation period, there is no reduction in the value of the expansion stiffness ES, and the maximum value of the expansion stiffness ES occurs at about 3.8 V. In the cycle period, the minimum value of the expansion stiffness ES was about 0.5 N/μm or more, and the maximum value of the expansion stiffness ES was about 0.8 N/μm or more.

Therefore, by measuring the expansion stiffness ES of the secondary battery, an influence of the gas generation and an influence of the electrode expansion may be evaluated nondestructively. Also, a change in the property of the electrode and a change in the property of the gas generation, which occur as a material deteriorates as a charge/discharge cycle progresses, may be evaluated through the property of the expansion stiffness ES. In addition the property of the expansion stiffness ES of the secondary battery may be used to determine design factors such as a mechanical strength of an outer case of the secondary battery.

Figure 17A:
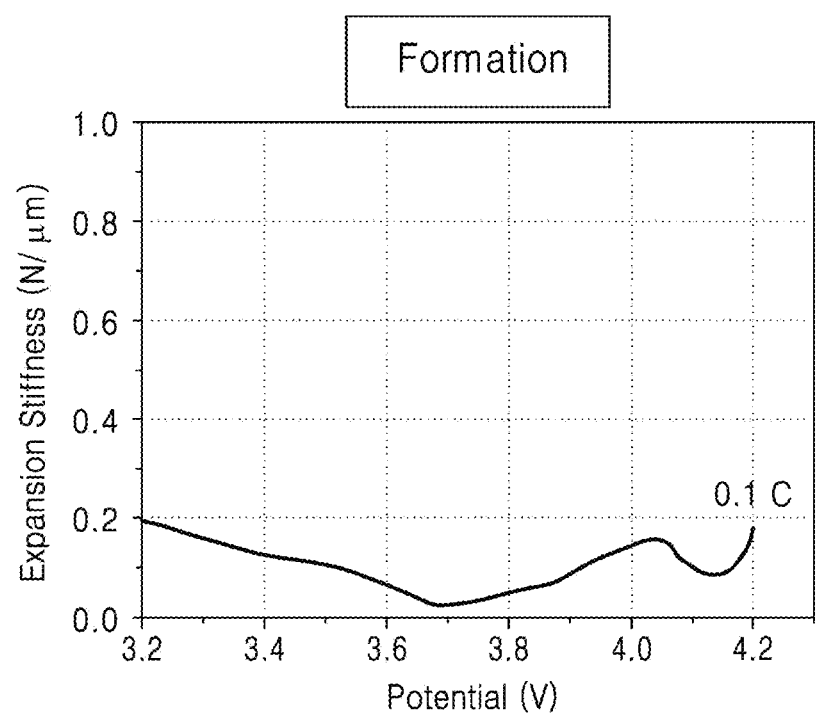
FIG. 17A is a graph of expansion stiffness (N/μm) versus potential (V), which shows a change in expansion stiffness during a formation period of a secondary battery.
Figure 17B:
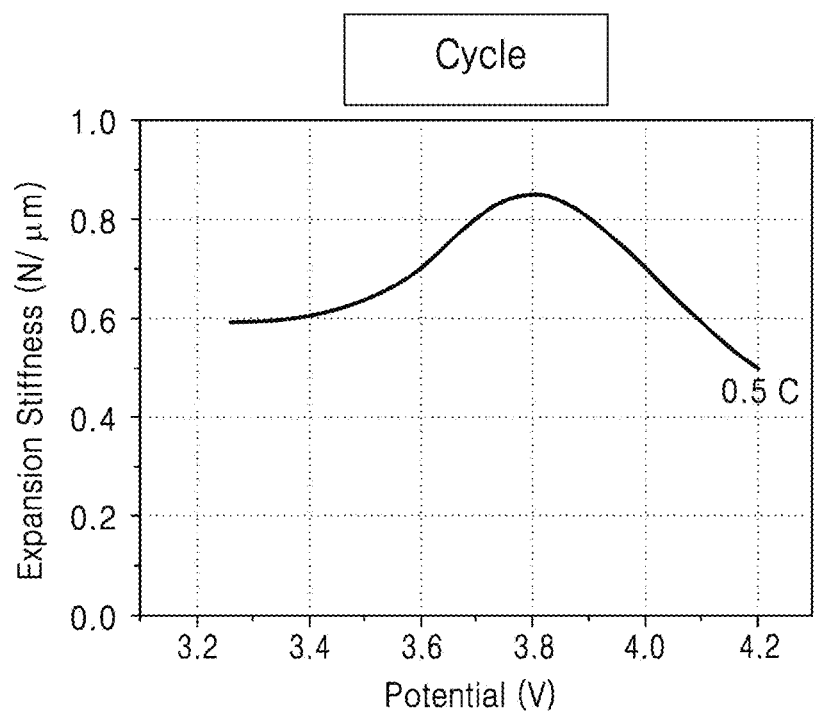
FIG. 17B is a graph of expansion stiffness (N/μm) versus potential (V), which shows a change in expansion stiffness with change in voltage during a first charge/discharge cycle after the formation period of the secondary battery.
Figure 17C:
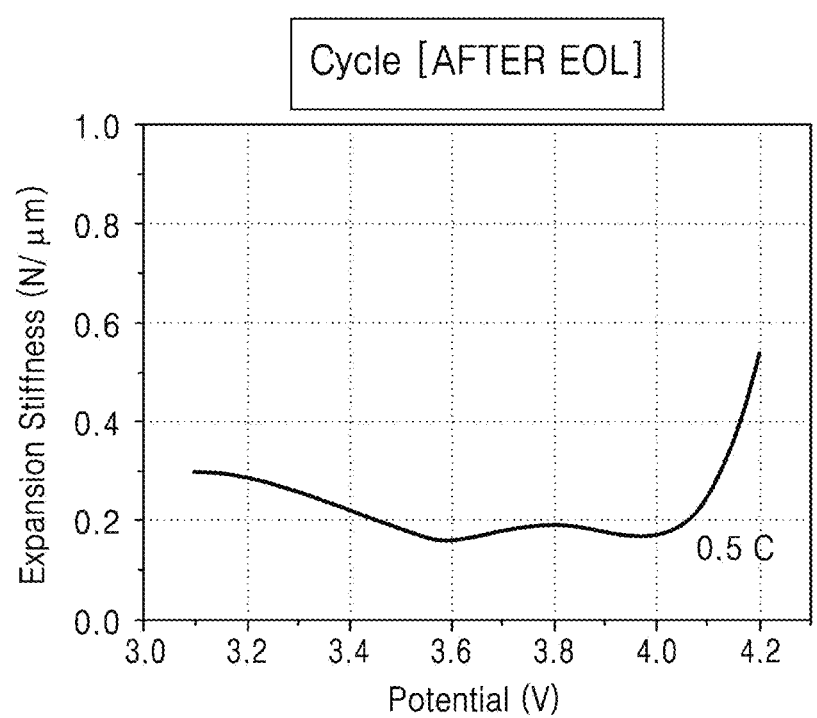
FIG. 17C is a graph of expansion stiffness (N/μm) versus potential (V), which shows change in expansion stiffness during a charge/discharge cycle after the end-of-life (EOL) of a secondary battery, in which end-of-life is defines as when a capacity of a secondary battery is to 80% or less of an initial capacity.

FIG. 17A shows a property of the expansion stiffness ES in a formation period of a secondary battery. FIG. 17B shows a property of the expansion stiffness ES in a cycle period after the formation period. FIG. 17C shows a property of the expansion stiffness ES after end-of-life (EOL) in which a capacity of a secondary battery is reduced to 80% or less.

FIGS. 17A and 17B are the same as a graph of FIG. 16, separated into the formation (FIG. 17A) and cycle (FIG. 17B) periods. In the formation period as shown in FIG. 17A, when gas is primarily generated, the expansion stiffness ES may be greater than 0 to about 0.2 N/μm. In the cycle period as shown in FIG. 17B, the maximum value of the expansion stiffness ES at a specific potential of 3.8V due to an electrode expansion may be about 1 N/μm or less, or for example, less than about 1 N/μm. As described above, since a change in the expansion stiffness ES due to the gas generation and a change in the expansion stiffness ES due to the electrode expansion clearly differ, the gas generation and the electrode expansion may be distinguished.

Figure 17D:
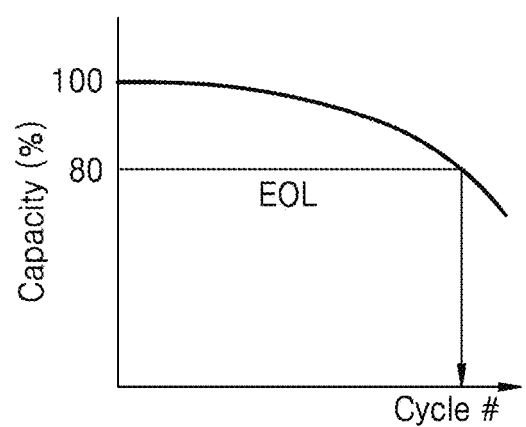
FIG. 17D is a graph of capacity (%) versus cycle number, showing determination of an end-of-life of the battery.

Referring to FIGS. 17C and 17D, the property of the expansion stiffness ES at the end-of-life (EOL) of the secondary battery, in which the capacity of the secondary battery is reduced to 80% or less, may be similar to a property of the expansion stiffness ES in the formation period. Therefore, the property of the expansion stiffness ES may be utilized to evaluate a deterioration state of the secondary battery. For example, when the secondary battery deteriorates, the property of expansion stiffness ES may be used to detect a generation time of the gas.

Figure 18A:
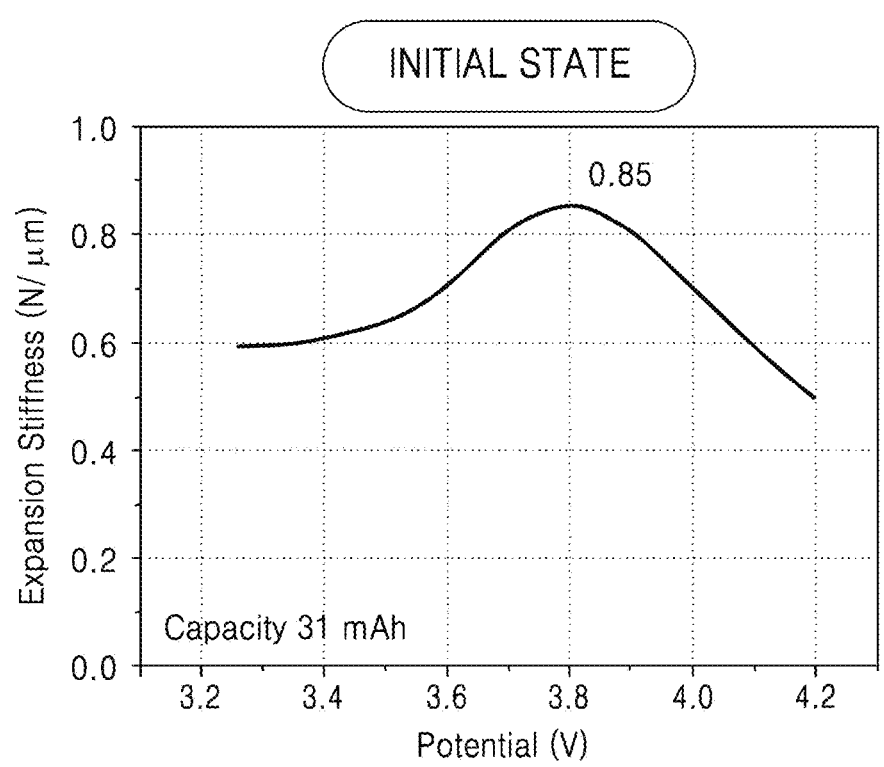
FIG. 18A a graph of expansion stiffness (N/μm) versus potential (V), which shows an expansion stiffness of a secondary battery in an initial state of a charge/discharge cycling.
Figure 18B:
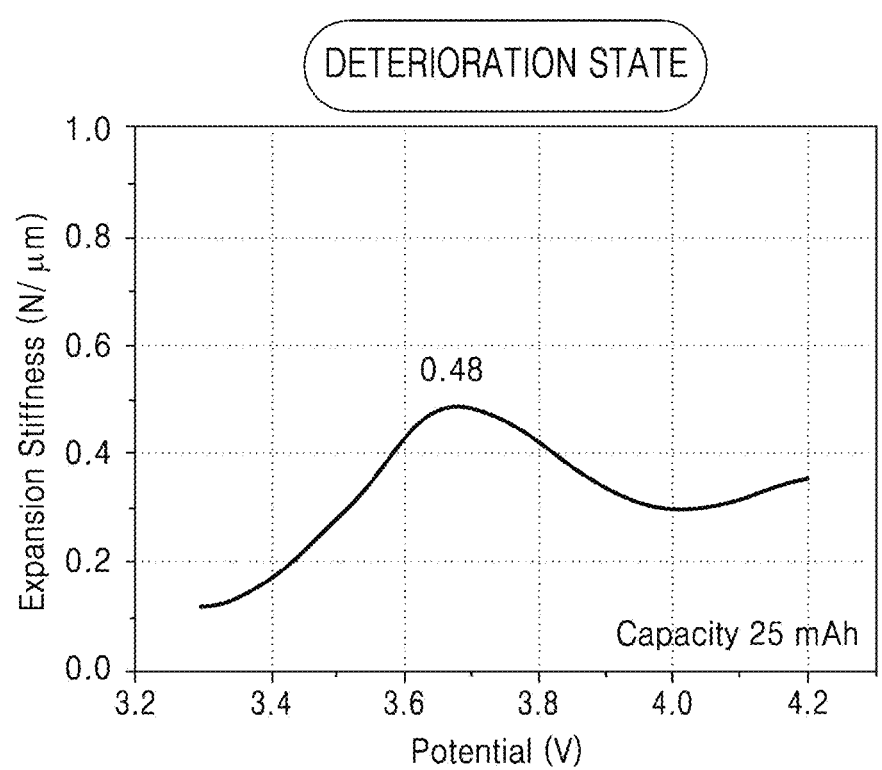
FIG. 18B a graph of expansion stiffness (N/μm) versus potential (V), which shows an expansion stiffness in a deterioration state of the secondary battery.

FIG. 18A shows the expansion stiffness ES in an initial charge/discharge cycle of a secondary battery. FIG. 18B shows a property of the expansion stiffness ES in a charge/discharge cycle period in a deteriorated state of the secondary battery. The initial state was 10 cycles and the deteriorated state was after 150 cycles. A capacity of the secondary battery in the initial state (FIG. 18A) was 31 milliampere hours (mAh), and a capacity of the secondary battery in the deteriorated state (FIG. 18B) was 25 mAh, which represents a reduction of 19.4%.

The maximum value of the expansion stiffness ES in the initial state of FIG. 18A was 0.85 N/μm, and the maximum value of the expansion stiffness ES in the deterioration state of FIG. 18B was 0.48 N/μm. The maximum value of the expansion stiffness ES is thus reduced by about 45%. Therefore, the property of expansion stiffness ES may be utilized to evaluate the deterioration state of the secondary battery.

A method of measuring the deformation stiffness DS of an article according to an embodiment may be understood based on the foregoing description. In summary, the method of measuring the deformation stiffness DS may include measuring a change in force generated in a thickness direction of the article by a volume change of the object, and simultaneously measuring a change in thickness due to the volume change of the object, and measuring the deformation stiffness DS obtained by differentiating the change in force with respect to the change in thickness. The deformation stiffness DS may include the expansion stiffness ES occurring due to a volume expansion of the object.

The deformation stiffness DS may be expressed by Equation 3.

$$\lim_{\Delta h \to 0} \frac{\Delta F}{\Delta h} = \left(\frac{F}{h}\right)' = \frac{dF}{dh} \qquad \text{Equation 3}$$

In Equation 3, F denotes a force generated in the thickness direction of the article, and h denotes a thickness of the article.

The article may include a secondary battery. The method may further include charging or discharging the secondary battery. Also, the method may further include adjusting a temperature of the object.

The apparatus and method for measuring the deformation stiffness DS of an article according to an embodiment, may be a technique utilizing expansion/contraction stiffness obtained by simultaneously measuring a thickness and a force of a battery or cell in real time according to a charge/discharge cycle, and in an environment where a secondary battery is actually used. By measuring the expansion stiffness ES, a gas generation inside the battery and an electrode expansion/contraction may be nondestructively detected and distinguished. Further, a deterioration state of the battery due to a progress of the charge/discharge cycle may be evaluated. Also, a cause of the battery expansion may be identified. That is, factors causing the gas generation and the electrode expansion due an electrolyte or a SEI decomposition may be distinguished. Also, a swelling property of a cell may be evaluated through a gas detection that may occur during the charge/discharge cycle. For example, a degree of the gas generation according to the amount of nickel (Ni) in a cathode active material may be evaluated, and a degree of the volume expansion according to content of silicon (Si) in an anode active material may be evaluated. Also, when or as the battery or cell deteriorates, deterioration diagnosis may be possible by measuring a change in the expansion stiffness ES of the electrode, as the change in the expansion stiffness exhibits a more significant difference than a change in a capacity retention ratio (CRR).

In particular, according to an embodiment, a value of the expansion stiffness ES according to a charge/discharge cycle and a temperature condition of a high-modulus polymer electrolyte may be measured to facilitate the development of an all-solid state battery. Such data may be used as an indicator of battery safety, such as a delay of an electric short phenomenon.

Also, the apparatus and method described herein may be effectively used in development of a medium-size to large-size secondary battery for use in an electric vehicle and as an energy storage system, as well as in the development of a small-size secondary battery used for an IT (information technology) device, as well as the development of high capacity/long life secondary batteries. Further, the apparatus and method according to the embodiments may be applied to other articles (materials) other than a secondary battery. For example, an elastic polymer material may be used for a variety of flexible biomaterials capable of deforming according to the conditions of the surrounding environment (temperature and humidity), and such biomaterials may be used for treatment of, for example, vascular diseases. A degree of cross-linking and a degree of swelling, etc. of such a polymer material exposed to conditions in a blood vessel may be evaluated through measurement of the expansion stiffness ES of the polymer material.

Also, the apparatus and method according to the embodiments may be utilized to determine a root cause of a warpage phenomenon caused by a difference in a thermal expansion coefficient between an organic material and in inorganic material substrate used in an organic-inorganic hybrid structure or a multilayer element, and to determine the optimal conditions of the organic/inorganic materials to prevent such a warpage phenomenon.

A pressure change measured at a constantly fixed thickness (spacing) may only be used to determine physical strength data for a cartridge frame, a case, and a pouch with which the battery cell is in contact. A change in force measured under a condition such as a fixed thickness (spacing) may not provide sufficient basic data with regard to autonomous expansion/contraction of the battery or cell. That is, it is difficult to evaluate variations in a physical property of a material constituting the battery or cell as the charge/discharge cycle progresses. However, according to the embodiments, changes in force and thickness of the article may be simultaneously measured while a change in thickness of the article (battery cell) may be allowed to occur relatively freely. Further, the stiffness may be measured therefrom, and thus data relating to the autonomous expansion/contraction of the object or article (e.g., a battery or cell) may be obtained.

Although a number of matters have been specifically described in the above description, they should not be construed as limiting the scope of the disclosure, but rather should be construed as examples of specific embodiments. For example, it is understood that the apparatus and method for measuring the deformation stiffness DS described with reference to FIGS. 5 to 11 may be modified in various ways. It will also be appreciated that various materials and devices as well as secondary batteries may be applied as articles.

It should be understood that embodiments described herein should be considered in a descriptive sense only and not for purposes of limitation. Descriptions of features or aspects within each embodiment should be considered as available for other similar features or aspects in other embodiments.

While an embodiment have been described with reference to the figures, it will be understood by those of ordinary skill in the art that various changes in form and details may be made therein without departing from the spirit and scope as defined by the following claims.

What is claimed is:

1. An apparatus for measuring a deformation stiffness of an article, the apparatus comprising:
   a force measuring means configured to measure a force generated in a thickness direction of the article;
   a thickness measuring means configured to measure a thickness due to a volume change of the article; and
   a data processor configured to differentiate the force with respect to the thickness to calculate the deformation stiffness of the article,
   wherein each of the force and the thickness are a result of a volume change of the article,
   wherein a hole is defined in the force measuring means, and
   wherein the thickness measuring means is configured to measure the thickness of the article through the hole.

2. The apparatus of claim 1, wherein the deformation stiffness comprises an expansion stiffness caused by a volume expansion of the article.

3. The apparatus of claim 1, wherein the apparatus further comprises a pedestal configured to receive the article.

4. The apparatus of claim 1, wherein the force measuring means comprises:
   a moving member configured to be disposed on the article and to move according to the volume change of the article;
   a fixing member disposed on the moving member; and
   a force detection sensor disposed between the moving member and the fixing member.

5. The apparatus of claim 4, wherein the thickness measuring means comprises:
   a thickness sensor; and
   a weight-applying member configured to be disposed between the article and the thickness sensor.

6. The apparatus of claim 5,
   wherein the hole is defined in each of the moving member and the fixing member,
   wherein the force detection sensor has a donut shape having an opening at a center thereof, and
   wherein the thickness sensor is configured to measure the thickness of the article through the hole and the opening.

7. The apparatus of claim 6, wherein the thickness sensor is configured to contact a surface of the article to measure the thickness.

8. The apparatus of claim 5,
   wherein the force measuring means comprises a plurality of the force detection sensors, which are disposed on an edge region of the moving member,
   wherein the force measuring means comprises a plurality of the fixing members disposed corresponding to the plurality of force detection sensors,
   wherein the hole is defined in a center portion of the moving member or in a region adjacent thereto, and
   wherein the thickness sensor is configured to measure the thickness of the article through the hole.

9. The apparatus of claim 8,
   wherein the force measuring means is configured to be disposed on a first region of the article, and
   wherein the thickness measuring means is configured to be disposed on a second region of the article, wherein the second region is spaced apart from the first region.

10. The apparatus of claim 9,
    wherein an area of the article comprising the first region and an area of the article comprising the second region are the same, and
    wherein a force applied to the first region during an initial measurement and a force applied to the second region during the initial measurement are the same.

11. The apparatus of claim 1, wherein the article comprises a secondary battery, and
    wherein the apparatus further comprises a charging/discharging apparatus configured to charge/discharge the secondary battery.

12. The apparatus of claim 1, wherein the article, the force measuring means, and the thickness measuring means are each disposed in a temperature-controlled chamber.

13. A method of measuring a deformation stiffness of an article, the method comprising:
    measuring a force generated in a thickness direction of the article;
    measuring a thickness of the article; and
    differentiating the force with respect to the thickness to calculate the deformation stiffness,
    wherein each of the force and the thickness are a result of a volume change of the article.

14. The method of claim 13, wherein the measuring of the force and the measuring of the thickness occurs at a same time.

15. The method of claim 13, wherein the volume change of the article is caused by a volume expansion of the article.

16. The method of claim 13, wherein the deformation stiffness is expressed by Equation 3:

$$\lim_{\Delta h \to 0} \frac{\Delta F}{\Delta h} = \left(\frac{F}{h}\right)' = \frac{dF}{dh} \qquad \text{Equation 3}$$

wherein F denotes a force generated in the thickness direction of the article and h denotes a thickness of the article.

17. The method of claim 13, wherein the article comprises a secondary battery, and
    wherein the method further comprises charging or discharging the secondary battery.

18. The method of claim 13, further comprising adjusting a temperature of the article.

19. An apparatus for measuring a deformation stiffness of an article,
    a force measuring means configured to measure a force generated in a thickness direction of the article;

a thickness measuring means configured to measure a thickness due to a volume change of the article; and a data processor configured to differentiate the force with respect to the thickness to calculate the deformation stiffness of the article, wherein each of the force and the thickness are a result of a volume change of the article, and wherein the force measuring means comprises:
- a moving member configured to be disposed on the article and to move according to the volume change of the article;
- a fixing member disposed on the moving member, the fixing member having a fixed position; and
- a force detection sensor disposed between the moving member and the fixing member, the force detection sensor configured to measure a change in force acting in a thickness direction according to the volume change of the article.

20. The apparatus of claim 19, wherein the apparatus further comprises a pedestal configured to receive the article.

\* \* \* \* \*